UNITED STATES PATENT OFFICE.

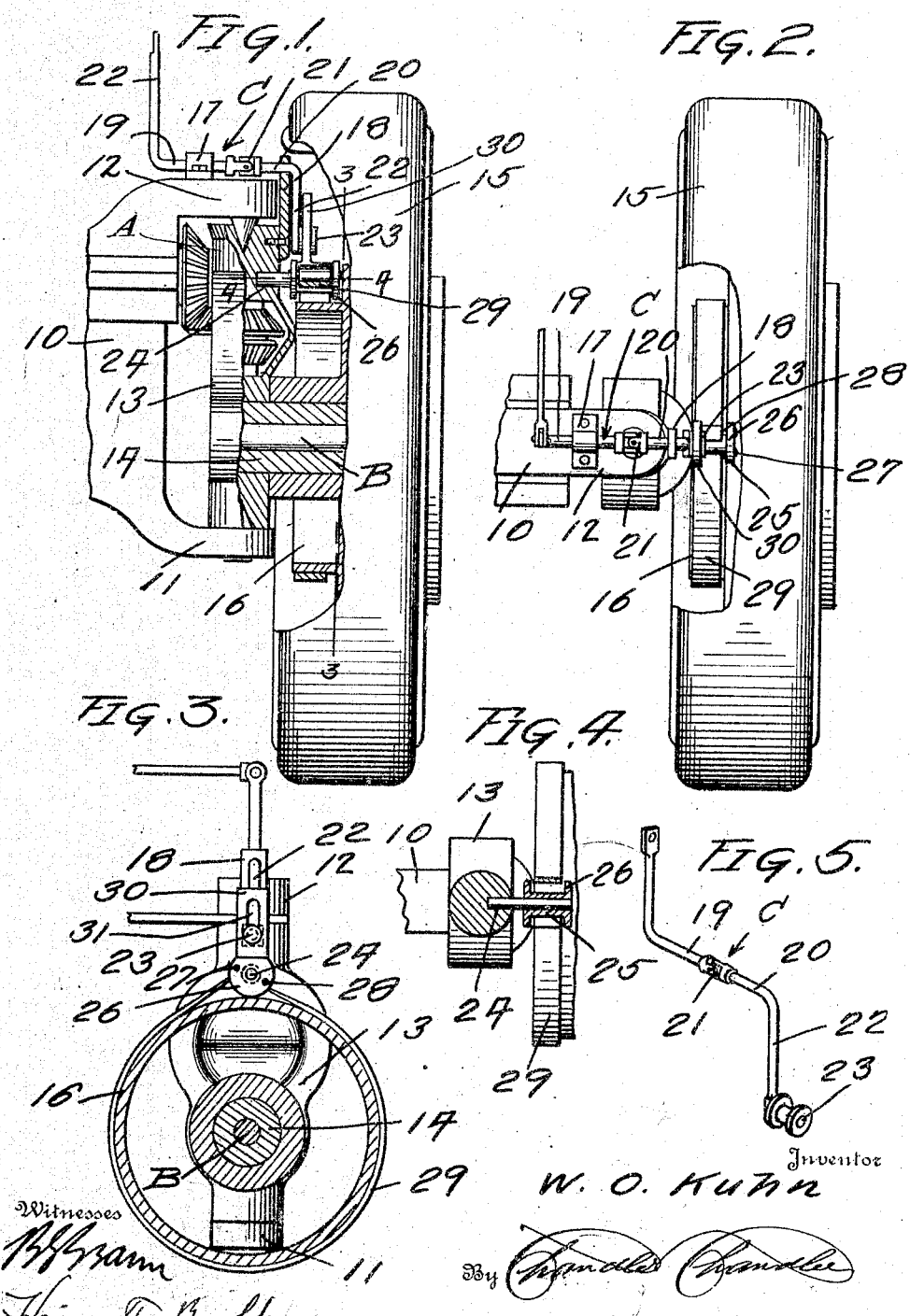

WILLIAM O. KUHN, OF WEBER, WASHINGTON.

BRAKE MECHANISM.

1,187,342.  Specification of Letters Patent.  Patented June 13, 1916.

Application filed July 28, 1915. Serial No. 42,397.

*To all whom it may concern:*

Be it known that I, WILLIAM O. KUHN, a citizen of the United States, residing at Weber, in the county of Grant, State of Washington, have invented certain new and useful Improvements in Brake Mechanism; and I do hereby declare the following to be a fully, clear, and exact description of the invention, such as will enable others skilled in the art to which it appertains to make and use the same.

This invention relates to brakes and particularly to those adapted for use in connection with motor vehicles.

It is my purpose to provide a brake structure embodying various improved details of construction whereby the device is rendered particularly adapted for use in four wheel drive motor vehicles wherein both the front and rear wheels are swung in the operation of steering, my improved braking mechanism being operable and effective during the steering operation and at all other times.

It is my further purpose to provide a brake structure which will be simple in construction, efficient in use and embodying comparatively few parts.

With the above and other purposes in view the invention consists in the details of construction and in the arrangement and combination of parts to be hereinafter more fully described and particularly pointed out in the appended claims.

In describing the invention in detail reference will be had to the accompanying drawings wherein like characters of references denote corresponding parts in the several views, and in which—

Figure 1 is a view in elevation of a fragment of the axle of a four wheel drive motor vehicle showing one of the wheels applied thereto and partly in section and also disclosing the improved brake mechanism; Fig. 2, a plan view of what is shown in Fig. 1 with the wheel partly broken away; Fig. 3, is a section on the line 3—3 of Fig. 1; Fig. 4, a section on the line 4—4 of Fig. 1, and Fig. 5, a perspective view of the brake operating shaft.

Referring to the drawings 10 indicates the axle of a motor vehicle which terminates in spaced ears 11 and 12. Swiveled between the ears 11 and 12 is a member 13 which supports a stub axle 14. Rotatably mounted on the axle 14 is a wheel 15 having formed integral therewith on the inner side thereof a brake drum 16. The member 13 is adapted to be rotated through the medium of any desired steering gear for the purpose of imparting steering movement to the wheel 15 as will be obvious. The wheel 15 is shown as directly driven through a system of gearing A operatively connected with a shaft B which latter is in turn connected to the wheel 15. The connections between the shaft B and the wheel 15 form the subject matter of my copending application, filed July 28, 1915, and serially numbered 42,398. Mounted on the ear 12 is a bearing 17, while another bearing 18 is mounted on the member 13 and rotatable in these bearings is a shaft C including sections 19 and 20 connected together by a universal joint 21. The outer end of the section 20 is provided with a lateral arm 22 carrying a stud 23. Mounted in the member 13 is a stud 24 upon which is rotatably supported a sleeve 25 having spaced circumscribing flanges 26. These flanges 26 are connected by pins 27 and 28 and attached to these pins respectively are the terminals of a brake band 29 which is engaged around the drum 16. The shaft C is adapted to be rotated by the driver of the motor vehicle in any desired manner and such rotation of said shaft will in turn effect rotation of the sleeve 25 and bind the brake band on the drum 16. The rotation of the sleeve 25 just referred to is effected by providing said sleeve with an arm 30 having a slot 31 therein in which the stud 23 on the arm 22 is adapted to work.

It will be noted that the universal joint 21 is disposed in the axis of rotation of the member 13 and that as a result of this construction the operation of the brake mechanism is not interfered with during the operation of steering.

What is claimed is:—

1. The combination with an axle, a rotatable member mounted transverse the axle at one end thereof, a stub axle carried by the member, and a wheel rotatably mounted on the axle, of a brake drum formed on the wheel, a stud projecting laterally from the rotatable member, a sleeve rotatable on said stud, a brake band surrounding the drum and having its terminals connected to said sleeve, a rotatable shaft mounted on the axle, and connections between said shaft and sleeve whereby the rotation of the former will rotate the latter to effect application of the brake band.

2. The combination with an axle, a rotatable member mounted transverse the axle at one end thereof, a stub axle carried by the member, and a wheel rotatably mounted on the axle, of a brake drum formed on the wheel, a stud projecting laterally from the rotatable member, a sleeve rotatable on said stud, a brake band surrounding the drum and having its terminals secured to said sleeve, an arm on said sleeve provided with a slot, bearings mounted on the axle and rotatable members respectively, a shaft mounted in said bearings and including a universal joint, an arm on said shaft, and a stud on said arm working in the slot of the arm on the sleeve.

In testimony whereof, I affix my signature, in the presence of two witnesses.

WILLIAM O. KUHN.

Witnesses:
FRANK J. KOLMAN,
C. TONSEY TAYLOR.